(12) United States Patent
Chi et al.

(10) Patent No.: US 8,823,632 B2
(45) Date of Patent: Sep. 2, 2014

(54) LIGHT GUIDE PANEL COMPRISING SYMMETRIC FRONT PRISM AND ASYMMETRIC FRONT PRISM FOR BACK LIGHT UNIT OF LCD

(75) Inventors: Chul Goo Chi, Gyeonggi-do (KR); Sung Hyun Joo, Gyeonggi-do (KR); O Yong Jeong, Gyeonggi-do (KR); Jae Han Kim, Gyeonggi-do (KR); Man Suk Kim, Gyeonggi-do (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 601 days.

(21) Appl. No.: 12/452,010

(22) PCT Filed: Nov. 26, 2007

(86) PCT No.: PCT/KR2007/006009
§ 371 (c)(1),
(2), (4) Date: Dec. 11, 2009

(87) PCT Pub. No.: WO2008/153254
PCT Pub. Date: Dec. 18, 2008

(65) Prior Publication Data
US 2010/0134403 A1 Jun. 3, 2010

(30) Foreign Application Priority Data
Jun. 12, 2007 (KR) .................. 10 2007 0057263

(51) Int. Cl.
*G09G 3/36* (2006.01)
*G02F 1/1335* (2006.01)

(52) U.S. Cl.
USPC ............................................ 345/102; 349/63

(58) Field of Classification Search
USPC ....................................... 345/102; 349/61–67
See application file for complete search history.

(56) References Cited

U.S. PATENT DOCUMENTS

| | | | | |
|---|---|---|---|---|
| 3,163,367 A | * | 12/1964 | Bodian | 362/330 |
| 5,771,328 A | * | 6/1998 | Wortman et al. | 385/146 |
| 5,838,404 A | * | 11/1998 | Ozeki et al. | 349/65 |
| 5,890,791 A | | 4/1999 | Saito | |
| 5,919,551 A | * | 7/1999 | Cobb et al. | 428/156 |
| 6,906,348 B2 | | 6/2005 | Sugiura | |
| 2006/0050200 A1 | * | 3/2006 | Nagao | 349/65 |

FOREIGN PATENT DOCUMENTS

| | | |
|---|---|---|
| CN | 1495483 A | 5/2004 |
| JP | 09-105804 A | 4/1997 |
| JP | 2001-250413 A | 9/2001 |
| JP | 2004-111353 A | 4/2004 |
| JP | 2004-152496 A | 5/2004 |
| TW | 351801 | 2/1999 |
| TW | 309123 | 4/2007 |
| TW | 200712647 U | 4/2007 |

OTHER PUBLICATIONS

Identification of Office Actions for TW 096145044 and English translation for the Taiwanese Search Report, Aug. 22, 2011.

* cited by examiner

*Primary Examiner* — Stephen Sherman
(74) *Attorney, Agent, or Firm* — Lee & Morse, P.C.

(57) ABSTRACT

Disclosed herein is a light guide panel for a backlight unit of a liquid crystal display (LCD). The light guide panel enables adjustment in viewing angle and brightness at a specific position and angle by controlling a cross-sectional shape of front prisms of the light guide panel.

9 Claims, 8 Drawing Sheets

LIGHT GUIDE PANEL COMPRISING SYMMETRIC FRONT PRISM AND ASYMMETRIC FRONT PRISM FOR BACK LIGHT UNIT OF LCD

TECHNICAL FIELD

The present invention relates to a light guide panel for a backlight unit of a liquid crystal display (LCD), and more particularly to a light guide panel for an LCD backlight unit that enables adjustment of a viewing angle and brightness at a specific position by controlling a cross-sectional shape of front prisms of the light guide panel.

BACKGROUND ART

In general, a liquid crystal display (LCD) refers to a device that displays numerals or images through application of an electric field to liquid crystals, which are a material having an intermediate phase between a liquid and a solid, and arranged between two glass substrates acting as electrodes.

Since the LCD is not an emissive device, it must be provided with a backlight unit as a light source for emitting light. Then, images and the like are displayed on a liquid crystal panel having liquid crystals arranged in a predetermined pattern by adjusting a transmittance amount of light emitted from the backlight unit.

FIG. 1 is an exploded perspective view of a conventional LCD backlight unit.

According to a position of a light source for emitting light, a backlight unit 10 of the liquid crystal display can be classified into a direct type backlight unit in which the light source is located directly at the rear of an LCD panel 100, and an edge type backlight unit in which the light source is located at a lateral side of the LCD panel 100. FIG. 1 shows an edge type backlight unit 10.

Referring to FIG. 1, the conventional LCD backlight unit includes a light source 105, a light guide panel 110, a reflection plate 115, a diffusion sheet 120, prism sheets 125, and a protector sheet 130.

The light source 105 serves to emanate light initially to the liquid crystal display. Although various types of light source can be used, the LCD generally employs a cold cathode fluorescence lamp (CCFL) that requires very low power consumption and enables emission of very bright white light.

The light guide panel 110 is located at one side of the light source 105 below the LCD panel 100, and serves to project light in front of the light guide panel after converting spot light of the light source 105 to plane light.

The reflection plate 115 is located at the rear of the light guide panel 110, and serves to reflect light emitted from the light source 105 towards the LCD panel 100 in front of the reflection plate.

The diffusion sheet 120 is positioned at an upper side of the light guide panel 110, and serves to uniformize light having passed through the light guide panel 110.

The prism sheets 125 serve to improve brightness by refracting and collecting light that tends to undergo a rapid decrease in brightness due to diffusion in both directions, i.e., horizontal and vertical directions while passing through the diffusion sheet 120.

The protector sheet 130 is disposed on the prism sheet, and serves to protect the prism sheets 125 from damage such as scratches and to prevent the Moire phenomenon that occurs when using the prism sheets 125 stacked in two layers in the horizontal and vertical directions.

Although not shown in FIG. 1, the backlight unit 10 further includes a mold frame or housing, which serves to secure respective components of the backlight unit 10 so as to allow the backlight unit 10 to be prepared as an integral component, and a back cover or lamp cover, which serves to protect and support the backlight unit 10 while maintaining the strength of the backlight unit 10.

The LCD can be classified into a twisted nematic (TN) type and an in-plane switching (IPS) type depending on the arrangement of liquid crystals. The TN type LCD has an inferior viewing angle to the IPS type LCD. However, since it has excellent transmittance, the TN type LCD is suitable for an LCD that requires front visibility. On the other hand, although the IPS type LCD has an excellent viewing angle compared to the TN type LCD, it has lower transmittance, which deteriorates overall brightness.

Thus, there is a need for an enhancement in brightness of LCD at a specific angle or compensation for brightness at a specific position depending on operation surroundings, kinds of LCD panel related to liquid crystals arranging manners, and other external factors.

Conventionally, a dual brightness enhancement film (DBEF) and a diffusive reflective polarization film (DRPF) have been used to compensate for brightness or to improve a viewing angle. However, these films lead to an increase in total thickness of a backlight unit along with an increase in manufacturing cost, thereby lowering competitiveness of LCD products adopting such films.

Item of brightness uniformity-viewing angle dependency in TCO'03 standard regulates that degrees of brightness uniformity with respect to horizontal and vertical views of a general visual display unit should be managed to fall within a specified range.

FIG. 2 shows measurement positions defined in the TCO'03 standard for characteristics evaluation of a general visual display unit. FIGS. 2 and 3 show the TCO'03 standard with respect to brightness uniformity-viewing angle dependency.

In the TCO'03 standard, degrees of brightness uniformity with respect to horizontal and vertical views are respectively defined as $L_H$ and $L_V$, and are regulated to have 1.7 or less. The TCO'03 standard is one of severe obstacles in development of TN mode liquid crystal displays (LCDs) having a relatively large restriction in viewing angle of a display. Accordingly, there is a need of components or techniques for controlling a viewing angle at a specific angle and brightness at a specific position in an LCD backlight unit.

DISCLOSURE

Technical Problem

The present invention has been made in view of the above problems, and an aspect of the present invention is to provide a light guide panel for an LCD backlight unit that enables adjustment in visibility at a specific location and in viewing angle at a specific angle to provide uniformly bright images on the overall surface of a display screen when the display screen is viewed not only from front side, but also from the right or left side of the display screen.

Technical Solution

In accordance with an aspect of the present invention, a light guide panel for an LCD backlight unit includes: a main body having a lateral side for receiving incident light, a front side for emitting light, and a rear side; a main prism part including a plurality of symmetric prisms disposed on the front side to have a separation plane between the symmetric prisms; and an assistant prism part including asymmetric front prisms, each being disposed on the separation plane.

Advantageous Effects

According to the present invention, a light guide panel for an LCD backlight unit optimizes distribution of horizontal viewing angles corresponding to requirement of a display, thereby enabling efficient use of a light source of the backlight unit.

In addition, the light guide panel has excellent viewing angle characteristics so as to provide uniformly bright images on the overall surface of the display when the display screen is viewed not only from front side, but also from the right or left side of the display screen. In particular, the light guide panel according to the present invention can satisfy optical characteristics under the TCO'03 standard.

BEST MODE

Figure 1:
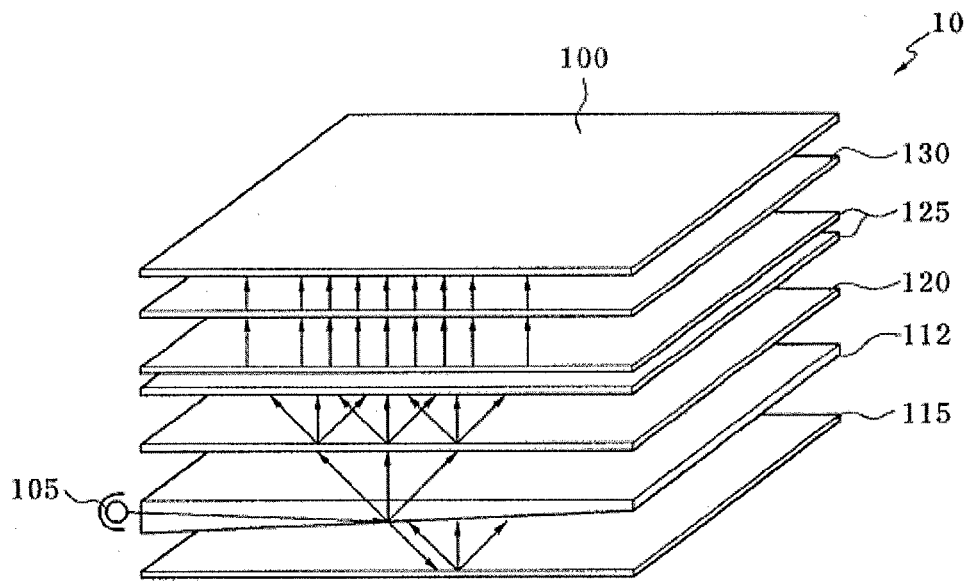
FIG. 1 is an exploded perspective view of a conventional LCD backlight unit.
Figure 2:
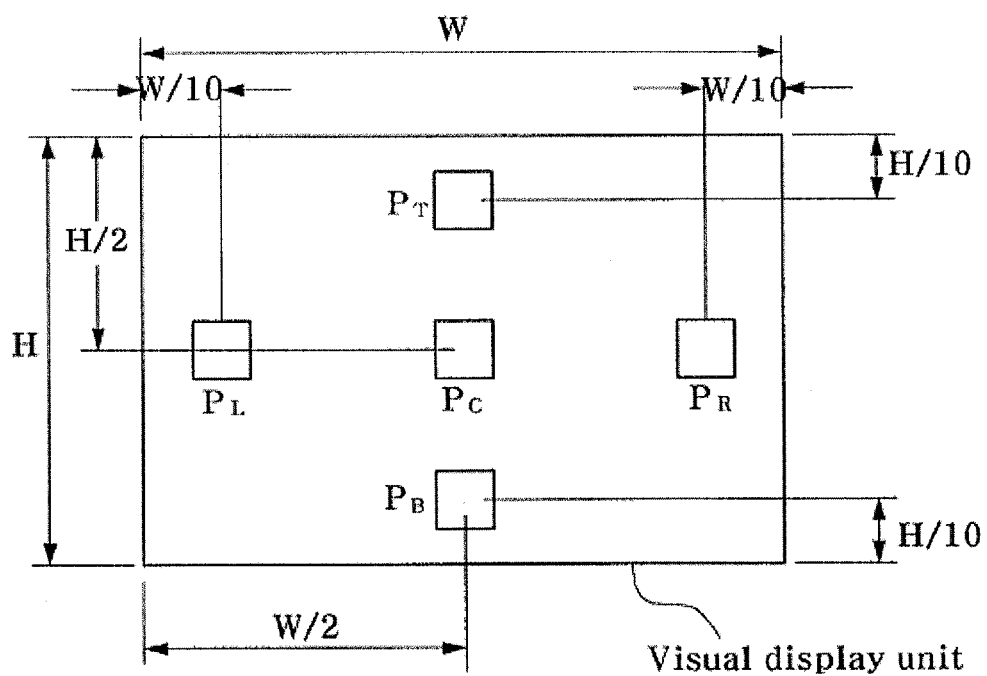
FIG. 2 shows measurement positions defined in the TCO'03 standard for characteristics evaluation of a general visual display unit.
Figure 3:
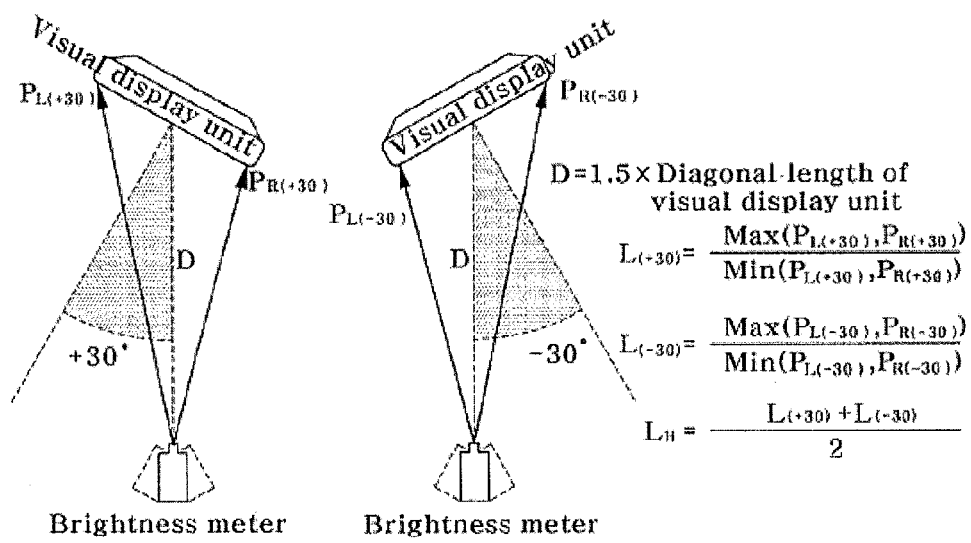
FIGS. 3 and 4 show the TCO'03 standard with respect to brightness uniformity-viewing angle dependency.
Figure 4:
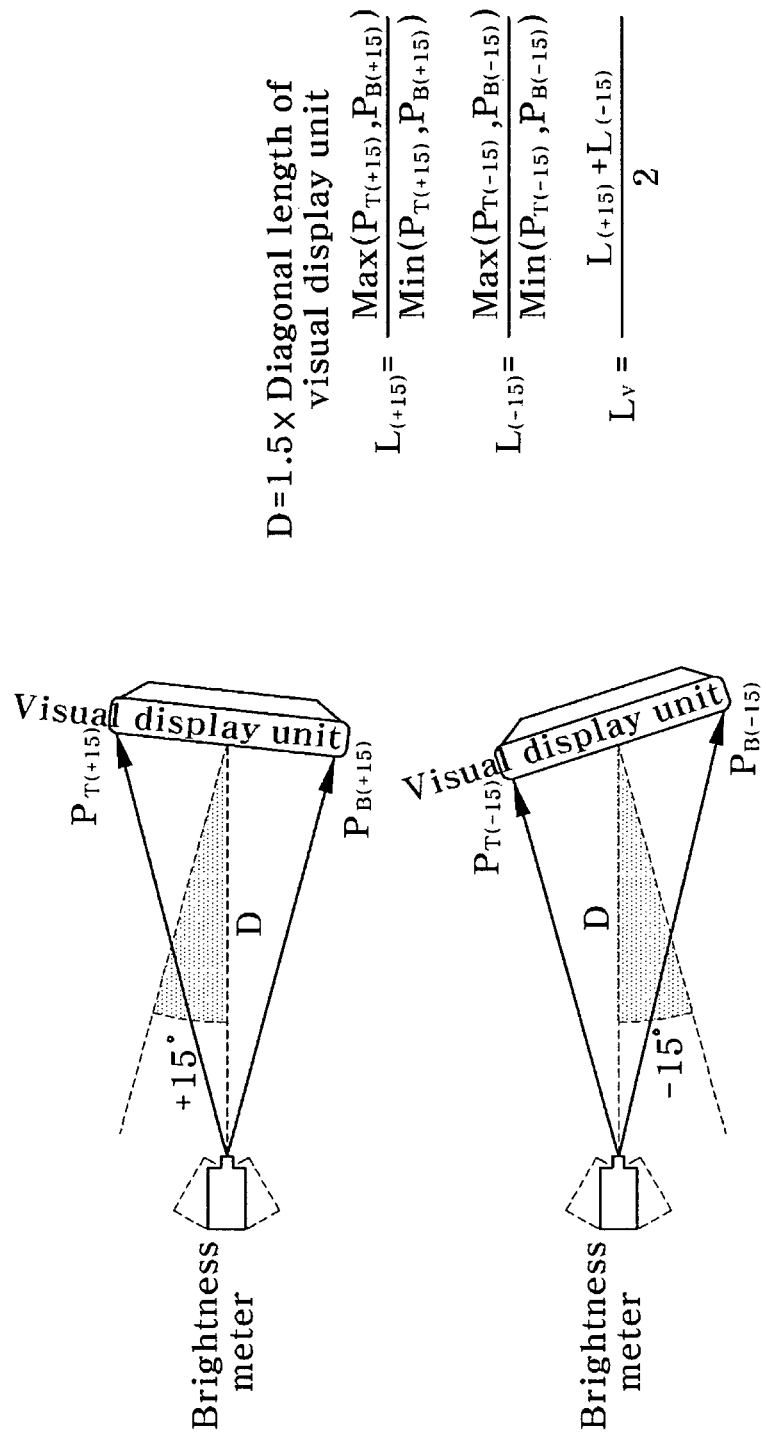
Figure 5:
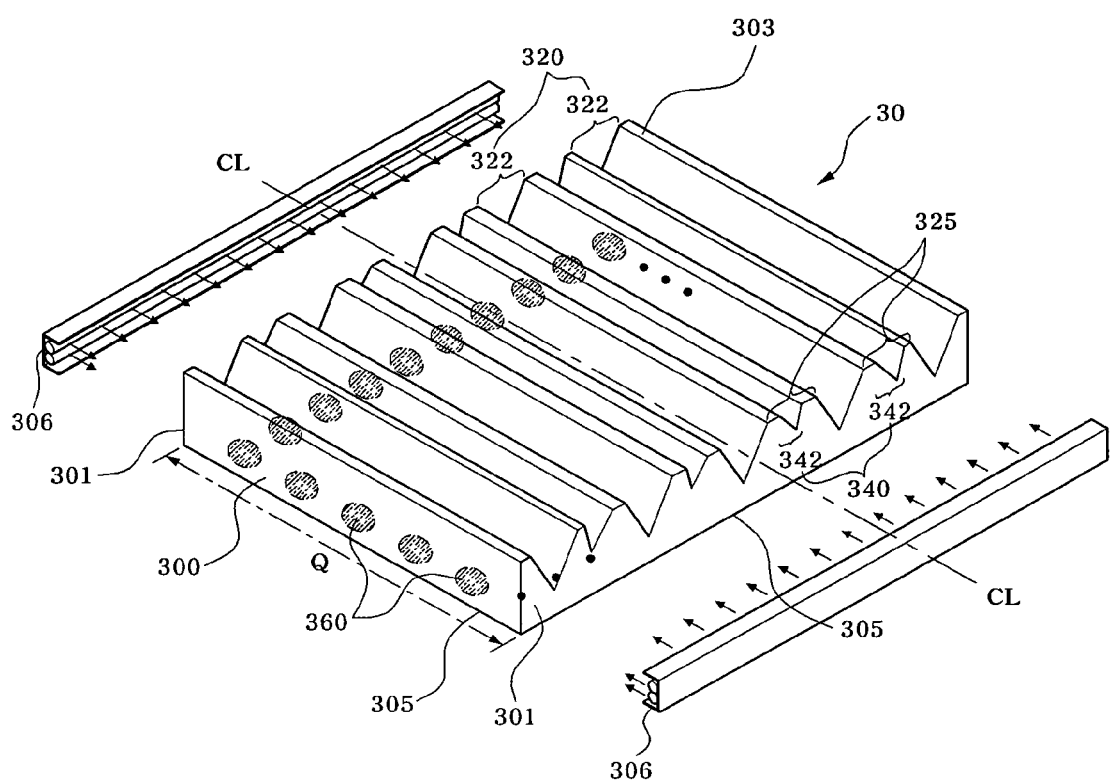
FIG. 5 is a perspective view of a light guide panel for an LCD backlight unit according to a first embodiment of the present invention.

FIG. 5 is a perspective view of a light guide panel for an LCD backlight unit according to a first embodiment of the present invention.

Referring to FIG. 5, a light guide panel 30 for an LCD backlight unit according to the first embodiment has a main body 300 that includes a lateral side 301 for receiving incident light, a front side 303 connected to the lateral side 301 and facing an LCD panel (not shown), and a rear side 305 connected to the lateral side 301 and facing the front side 303.

The term "lateral side 301" means lexically a side of an object, but is defined herein as a surface through which light emitted from a light source 306 enters the light guide panel. In FIG. 5, the lateral side 301 means two opposite sides adjacent to the light source 306.

The front side 303 is formed with a main prism part 320 and an assistant prism part 340, both of which have predetermined cross-sectional shapes and serve to cause uniform diffraction, refraction, and diffusion of light emitted through the main body 300.

The rear side 305 is formed with rear prisms 360. The rear prisms 360 are formed perpendicular to symmetric prisms 322 of the main prism part 320, which are formed on the front side. The rear prisms 360 can be formed in a dot pattern as shown in the figure, or can be formed in a stripe pattern. Since the present invention relates to the configuration of the main prism part 320 and the assistant prism part 340 on the front side, a detailed description of the rear prisms 360 will be omitted herein.

The main prism part 320 includes a plurality of symmetric prisms 322 disposed to have a separation plane 325 defined between the symmetric prisms 322, and the assistant prism part 340 includes an asymmetric prism 342 disposed on the separation plane 325.

The main prism part 320 has a bilaterally symmetric cross-sectional shape with respect to a centerline (CL) of the light guide panel.

The symmetric prism 322 and the asymmetric prism 342 have a longitudinal direction parallel to Q direction, that is, an incident direction of light from the light source in FIG. 5.

The separation plane 325 between the symmetric prisms 322 is provided to improve uniformity and visibility of light. That is, when the symmetric prisms 333 cause diffraction, refraction and diffusion of light emitted from the main body 300 in a direction inclined to an LCD panel (not shown) facing the light guide panel 30, the separation plane 325 disposed between the symmetric prisms 322 serves to allow the light to travel perpendicular to the LCD panel (not shown), thereby further improving uniformity of light reaching the LCD panel (not shown).

The asymmetric prism 342 on the separation plane 325 serves to improve uniformity of light with respect to horizontal and vertical viewing angles. Since the symmetric prisms 322 and the separation plane 325 can adjust the uniformity of light with respect to a front viewing angle, the bilaterally asymmetric prism 342 are formed to improve the uniformity of light with respect to the horizontal and vertical viewing angles, thereby satisfying the viewing angle characteristics under the TCO'03 standard.

Figure 6:
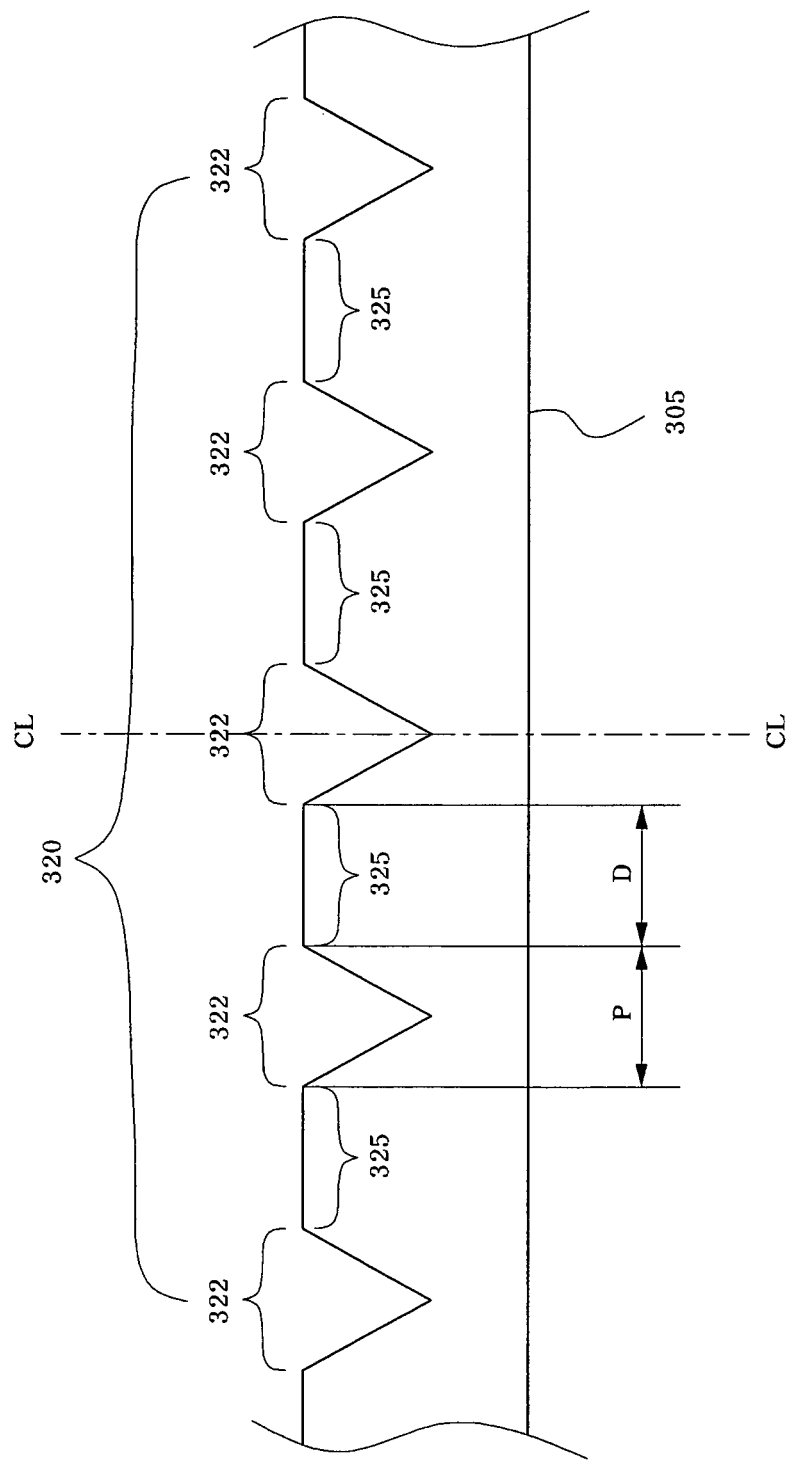
FIG. 6 is a cross-sectional view of the light guide panel having a main prism part according to the first embodiment of the present invention.

FIG. 6 is a cross-sectional view of the light guide panel having only the main prism part according to the first embodiment of the present invention.

Referring to FIG. 6, the main prism part 320 includes the plural symmetric prisms 322 separated at constant intervals from one another to have the separation planes 325 therebetween. Each of the symmetric prisms 322 is formed to have symmetrically inclined sides engraved into a plane, and has a cross-section of a triangular shape, of which a vertex faces downward.

The separation planes 325 are defined between the symmetric prisms 322, and will be formed thereon with asymmetric prisms 342 (see FIG. 7) by engraving.

At this time, a ratio of pitch (P) of a single symmetric prism 322 to distance (D) of a single separation plane 325 is preferably in the range of 4:6~6:4. The ratio of pitch (P) of the single symmetric prism to distance (D) of the single separation plane can be an area ratio of total symmetric prisms 322 to total separation planes on the overall surface area of the front side 303 of the light guide panel.

If the area ratio of the separation planes 325 is high, central brightness becomes increased, whereas if the area ratio of the symmetric prisms 322 is high, side brightness becomes increased. Accordingly, it is possible to control the brightness uniformity through adjustment of this ratio.

Meanwhile, although it is possible to control the brightness uniformity by the main prism part 320 and the separation planes 325, there is a limit in satisfying the viewing angle characteristics under the TCO'03 standard. Therefore, according to the present invention, the asymmetrical prisms 342 (see FIG. 7) are formed on the separation planes 325 to adjust a viewing angle at a specific location and angle.

Figure 7:
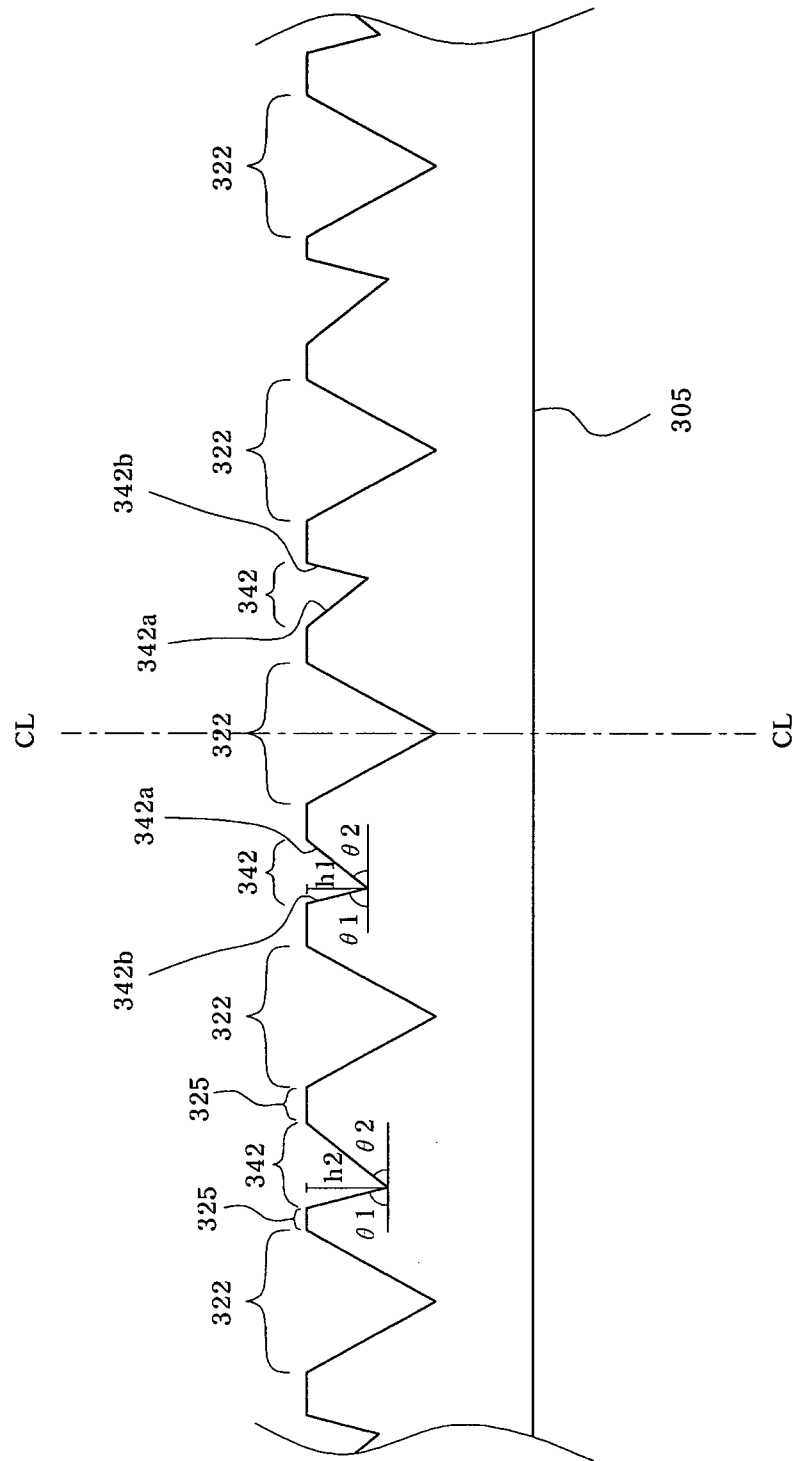
FIG. 7 is a cross-sectional view of the light guide panel having the main prism part and an assistant prism part according to the first embodiment of the present invention.

FIG. 7 is a cross-sectional view of the light guide panel having the main prism part and the assistant prism part according to the first embodiment of the present invention.

Figure 8:
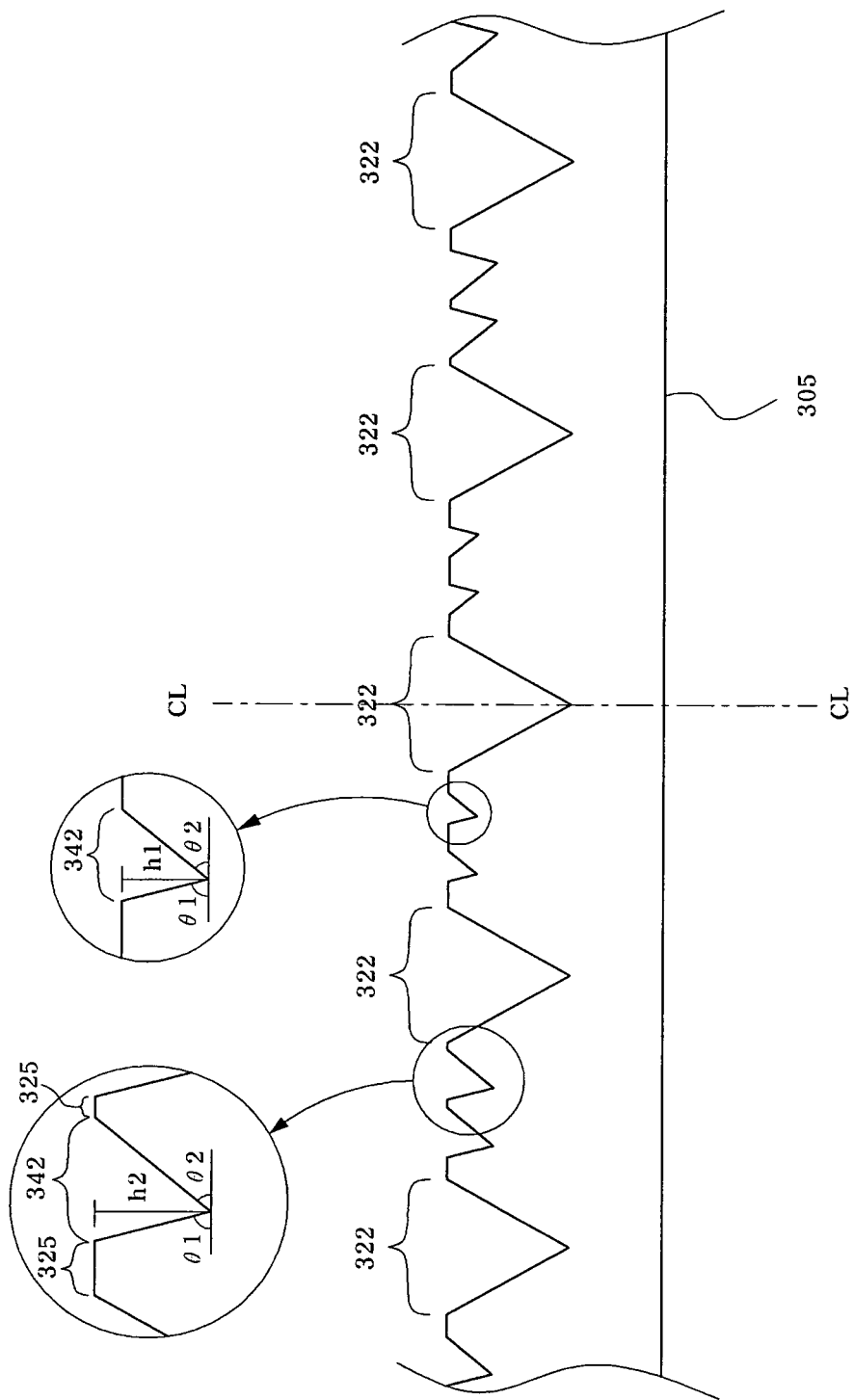
FIG. 8 is a cross-sectional view of a light guide panel for an LCD backlight unit according to a second embodiment of the present invention.

The asymmetric prisms 342 constituting the assistant prism part 340 are formed on the separation plane 325 by engraving. As shown in FIG. 7, a single asymmetric prism 342 may be formed on a single separation plane 325, or as shown in FIG. 8, a plurality of asymmetric prisms 342 may be formed on a single separation plane 325. Each of the asymmetric prisms 342 are formed such that an inner side 342a facing the centerline (CL) of the light guide panel has a different internal angle from that of an outer side 342b facing an edge of the light guide panel.

When arranged on the separation planes, the plural asymmetric prisms 342 are disposed in a bilaterally symmetrical arrangement with respect to the centerline (CL). With this arrangement of the plural asymmetric prisms 342, it is possible to maintain uniform brightness at the right and left side of the display.

As shown in FIG. 7, for the asymmetric prisms 342 located at the left side of the centerline (CL), a right side of each asymmetric prism 342 becomes the inner side 342a and a left side thereof becomes the outer side 342b. And, for the asymmetric prisms 342 located at the right side of the centerline (CL), a left side of each asymmetric prism 342 becomes the inner side 342a and a right side thereof becomes the outer side 342b.

Both inner and outer sides 342a and 342b preferably have an internal angle of 90 degrees or less. Further, the inner side 342a facing the centerline (CL) preferably has a smaller internal angle ($\theta 2$) than an internal angle ($\theta 1$) of the outer side 342b facing the edge ($\theta 1 > \theta 2$).

Preferably, the inner side 342a has an internal angle ($\theta 2$) in the range of 35 degrees $\leq \theta 2 \leq 55$ degrees, and the outer side 342b has an internal angle ($\theta 1$) in the range of 70 degrees $\leq \theta 1 \leq 90$ degrees.

Such a configuration of the asymmetric prism 342 is to satisfy the TCO'03 standard, and provides an image that has uniform brightness on the overall surface of a display screen even when the screen is viewed from one lateral side.

Further, the asymmetric prisms 342 are preferably formed to have an increasing depth (h1<h2) with an increase in distance from the centerline (CL). By this configuration of the asymmetric prism 342, the number of separation planes 325 increases as the separation planes 325 approach the centerline (CL) and decreases as they approach the edge. If the asymmetric prisms 342 are formed to have a large depth near the centerline (CL), an interference pattern can be formed by interference of light at the centerline (CL) due to the bilaterally symmetric arrangement of the asymmetric prisms 342.

FIG. 8 is a cross-sectional view of a light guide panel for an LCD backlight unit according to a second embodiment of the present invention.

Referring to FIG. 8, a plurality of asymmetric prisms 342 may be formed on a single separation plane. As in the embodiment described above, an inner side 342a of each asymmetric prism 342 facing the centerline (CL) has a greater internal angle ($\theta 1$) than an internal angle ($\theta 2$) of the outer side 342b ($\theta 1 > \theta 2$). Further, the asymmetric prisms 342 are formed to have a decreasing depth (h1<h2) as they approach the centerline CL.

Figure 9:
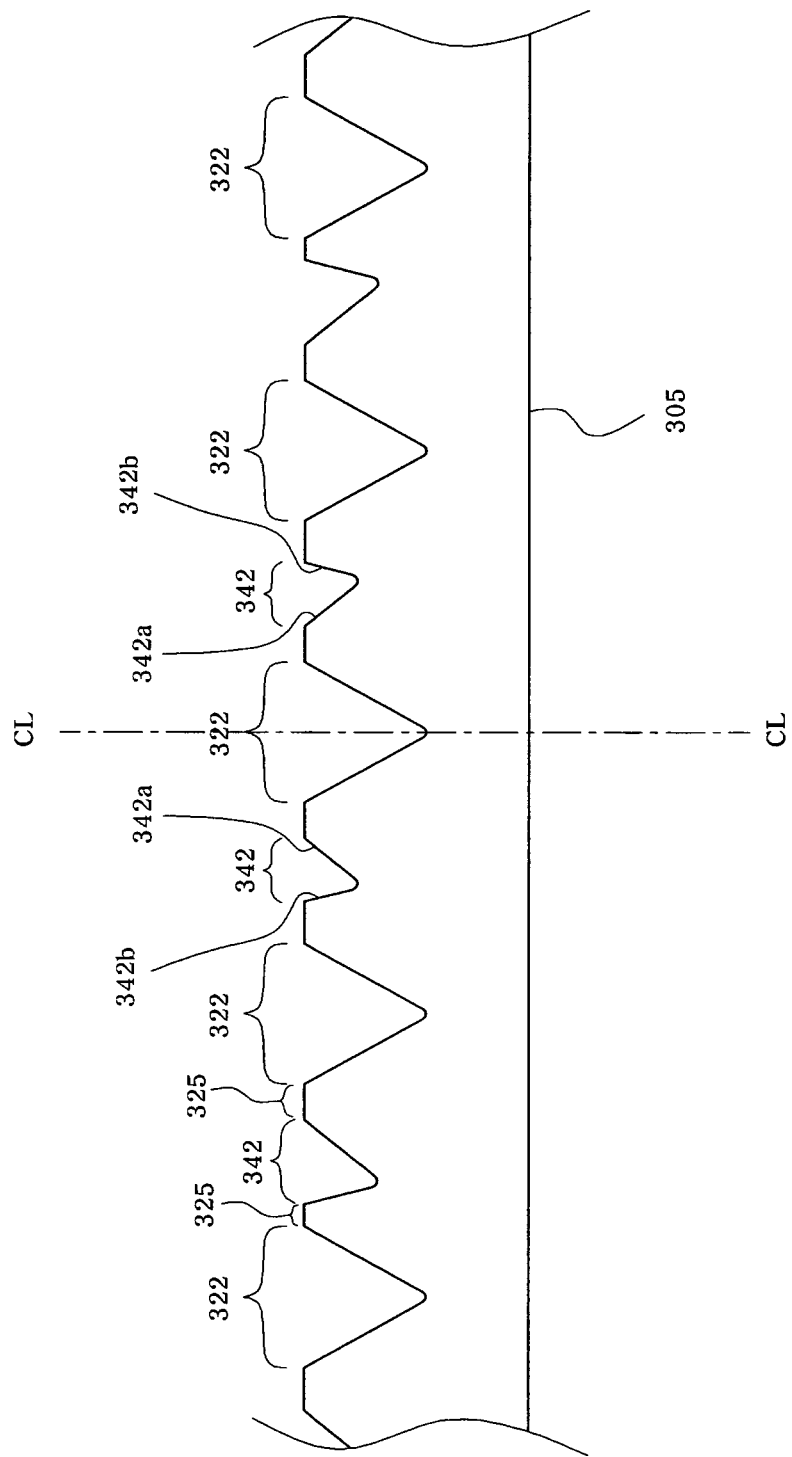
FIG. 9 is a cross-sectional view of a modification of the light guide panel according to the first embodiment of the present invention.

FIG. 9 is a cross-sectional view of a modification of the light guide panel according to the first embodiment of the present invention Referring to FIG. 9, the symmetric prism 322 and the asymmetric prism 342 may have a rounded lower end. This modification can be applied to the second embodiment in which the plural asymmetric prisms 342 are formed on the single separation plane 342. This modification can prevent generation of interference patterns by forming a rounded plane where different planes meet each other.

The invention claimed is:

1. A light guide panel for LCD backlight unit, comprising;
    a main body including a lateral side for receiving incident light, a front side for emitting light, and a rear side:
    symmetric prisms disposed in the front side;
    substantially coplanar separation planes disposed at the front side, each symmetric prism abutting at least one of the separation planes, directly adjacent symmetric prisms having at least one separation plane therebetween; and
    asymmetric prisms disposed in the front side, directly adjacent symmetric prisms having at least one asymmetric prism therebetween, each asymmetric prism abutting at least one of the separation planes, wherein:
    the symmetric prisms and the asymmetric prisms have a longitudinal direction parallel to an incident direction of light, and
    the asymmetric prisms are disposed in a bilaterally symmetrical arrangement with respect to a centerline (CL) of the light guide panel, the asymmetric prisms on one side of the centerline having vertices that are reversed relative to the asymmetric prisms on an opposite side of the centerline.

2. The light guide panel according to claim 1, wherein a ratio of pitch of a single one of the symmetric prisms to distance of a single one of the separation planes is in the range of 4:6~6:4.

3. The light guide panel according to claim 1, wherein directly adjacent ones of the separation planes have a plurality of the asymmetric prisms disposed therebetween.

4. The light guide panel according to claim 1, wherein directly adjacent ones of the separation planes have a single one of the asymmetric prisms disposed therebetween.

5. The light guide panel according to claim 1, wherein the asymmetric prisms have an internal angle of 90 degrees or less at either side.

6. The light guide panel according to claim 1, wherein each asymmetric prism has an inner side and an outer side, the outer side being disposed farther from the centerline such that the inner side is between the centerline and the outer side, the inner side having a smaller internal angle than that of the outer side, the internal angles being measured relative to a plane that is parallel to the separation planes.

7. The light guide panel according to claim 6, wherein the inner side has an internal angle in the range of 35~55 degrees, and the outer side has an internal angle in the range of 70~90 degrees.

8. The light guide panel according to claim 1, wherein the asymmetric prisms are formed to have an increasing depth, relative to the separation planes, with an increase in distance from the centerline (CL) of the light guide panel.

9. The light guide panel according to claim 1, wherein lowermost vertices, which are closest to the rear side, of the symmetric prisms and the asymmetric prisms are rounded.

* * * * *